M. STAUB.
Lathe Chuck.

No. 50,747.

Patented Oct. 31, 1865.

Witnesses:

Inventor:

UNITED STATES PATENT OFFICE.

MATHIAS STAUB, OF PHILADELPHIA, PENNSYLVANIA.

IMPROVEMENT IN CHUCKS.

Specification forming part of Letters Patent No. 50,747, dated October 31, 1865.

*To all whom it may concern:*

Be it known that I, MATHIAS STAUB, of the city and county of Philadelphia, and State of Pennsylvania, have invented a new and useful Improvement in Chucks for Lathes; and I do hereby declare the following to be a full, clear, and exact description of the nature, construction, and operation of the same, reference being had to the accompanying drawings, which are made part of this specification, and in which—

Figure 1:
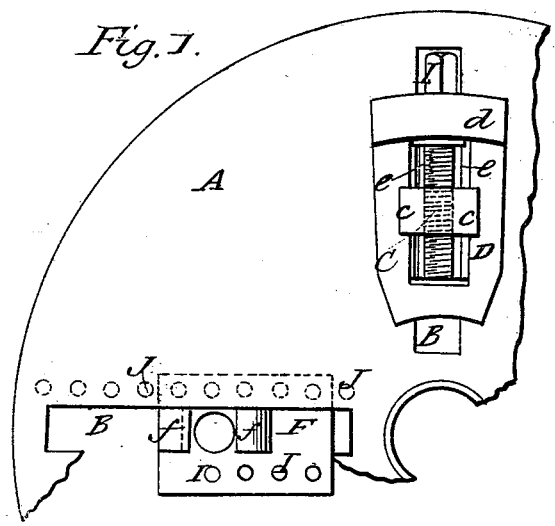
Figure 2:
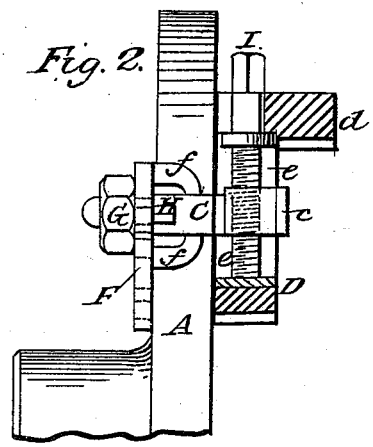
Figure 3:
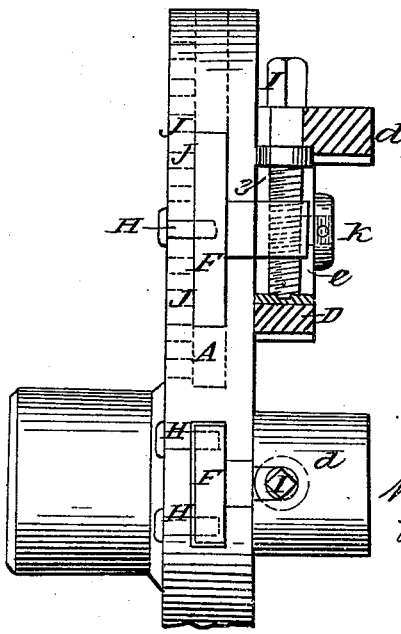

Figure 1 represents, in face elevation, a portion of the face-plate with one of the dogs in position and the clamp of another dog in position, the dog itself being removed. Fig. 2 is a side elevation of one of the dogs, the red lines showing the relative position of the face-plate. Fig. 3 is a side elevation of a mandrel and dogs whose attachment to the face-plate differs from that shown in Figs. 1 and 2.

The same letters refer to corresponding parts in the different figures.

The invention consists in the method of attaching the dogs to and adjusting them upon the face-plate, and the drawings show the method as applied to those face-plates which have an undercut radial slot which extends to the periphery, Fig. 3, and to those which have a slot extending through from face to back, but leaving the periphery unbroken, Figs. 1 and 2.

To enable one skilled in the branch of manufacture to which my invention appertains to construct and use the same, I will proceed to describe it in detail.

The face-plates A are represented in red lines, and have radial slots B in them, which are traversed by the shanks C of the dogs D as the latter are set out or in from or to the center of the face-plate, in order to accommodate them to the margin of the piece which is being chucked. The dogs are all independent of each other, it not being designed to make their motions simultaneous, so as to cause them, being equally upon the symmetrical margin of the material under treatment, to bring the center of the same to the center of the lathe.

The purpose of my device is to dog upon the face-plate the object in which I wish to bore a hole, so that the desired spot is presented to the drill or boring tool, while the dogs hold it fast in position on the rotating face-plate.

To come to the details of the method of securing and adjusting the dog upon the face-plate, I will first describe that shown in Figs. 1 and 2, where the radial slot extends from face to back of the face-plate, while the periphery of the same is continuous.

The dog has a body, D, and lug d, also an opening, e, in which the shank C traverses as the set-screw E is rotated to give radial adjustment to the dog. The shank C, whose lips c c rest against the body of the dog, is prolonged through the slot in the face-plate, and, passing through the back clamp, F, is secured by a nut, G, the appropriate rotation of which, drawing upon the shank firmly, embraces the face-plate between the back clamp, F, and the body of the dog.

When the requirement of the piece to be chucked necessitates considerable radial adjustment of the dogs, the pins H, which occupy holes I in the back-plate, and corresponding holes J in the face-plate, are taken out, the back clamp moved radially to the point desired, or as near it as may be, the pins restored, and the nut screwed on, its head resting against the heads of the pins if necessary to maintain them in position. The further more accurate adjustment is then made by the rotation of the screw E, as the dog cannot be set by the radial adjustment of the back clamp, F, within a space equal to one-half the distance between the adjacent holes in the back clamp. The prongs f, attached to the back clamp, enter the slot B, and, embracing the shank, steady the same and prevent rocking motion, as the dog and clamp moved by one hand would otherwise tend to bind against the face-plate.

In Fig. 3 a similar back plate is used, with this difference in its position, that it traverses the enlarged or undercut portion of the radial slot in the face-plate, the pins H extending through the holes J in the face-plate and into the holes I in the back plate, F, while the arrangement of the adjusting-screw E is the same as that described above.

The dog is attached to the shank by means of the nut K, whose thread enters the shank and whose head bears against the body of the dog.

Having described my invention, what I claim as new, and desire to secure by Letters Patent, is—

The combination of the perforated plate A, the perforated back clamp, F, and pins H, substantially as described and represented.

MATHIAS STAUB.

Witnesses:
THOMAS REICH,
C. FROEHLICH.